United States Patent

[11] 3,612,664

| [72] | Inventor | Leon J. Berman<br>Culver City, Calif. |
|------|----------|--------------------------------------|
| [21] | Appl. No. | 2,758 |
| [22] | Filed | Jan. 14, 1970 |
| [45] | Patented | Oct. 12, 1971 |
| [73] | Assignee | The United States of America as represented by the Secretary of the Navy |

[54] OPTICAL PATH COMPENSATING DEVICE
5 Claims, 3 Drawing Figs.

| [52] | U.S. Cl. | 350/253 |
|------|----------|---------|
| [51] | Int. Cl. | G02b 7/24 |
| [50] | Field of Search | 350/179, 180, 253, 310, 187 |

[56] References Cited

UNITED STATES PATENTS

| 3,161,718 | 12/1964 | De Luca | 350/180 |
| 3,496,851 | 2/1970 | Himmelsbach | 350/187 X |

FOREIGN PATENTS

| 987,988 | 4/1951 | France | 350/253 |

*Primary Examiner*—John K. Corbin
*Attorneys*—Richard S. Sciascia, Q. Baxter Warner and Gayward N. Mann

ABSTRACT: A device to compensate for changes in the length of an optical path due to ambient temperature variations. It employs a chamber, filled with temperature-responsive fluid, a moveable chamber wall, and linkage means connecting said wall to the lens mounts whereby changes in fluid volume adjust the length of the optical path.

PATENTED OCT 12 1971 3,612,664

INVENTOR
LEON J. BERMAN
BY Gaynard N. Mann
  Baxter Mann
ATTORNEYS 3,612,664

OPTICAL PATH COMPENSATING DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates in general to lens mounts and more particularly to lens mounts having means for compensating for ambient temperature variations.

2. Description of the Prior Art

In optical devices the length of the optical paths may vary due to temperature changes in the environment. Previously attempts have been made to compensate for such changes by incorporating into the lens mount, structures made of bimetallic materials which compensate for temperature changes by differences in the rate of expansion or contraction of the metallic materials. This is intended to move the lens in a manner calculated to maintain the proper length of a focal path within the optical system. Such a method or variations thereof may become quite complicated and are usually expensive. The present method uses changes in ambient temperatures to expand or contract a liquid which in turn permits calculated movement of associated equipment to maintain a proper focal length. It is simple in design, reliable in operation and inexpensive to operate.

SUMMARY OF THE INVENTION

A device to compensate for changes of focal length in optical systems due to variations in ambient temperatures. It includes a reservoir of temperature-responsive fluid which expands or contracts in volume as the ambient temperature changes to operate linkage means connected with a lens supporting cell, thus adjusting the lens in response to varying ambient temperatures. An electric heat source is optionally provided so that the hydraulic medium temperature may be varied from a remote source if desired.

OBJECTS OF THE INVENTION

An object of the present invention is to provide a device capable of automatically correcting optical path lengths altered by expansion and contraction of materials caused by ambient temperature changes.

Another object is to provide a lens mount capable of being adjusted from a remote source.

A further object is to provide a lens mount simple in design, reliable in operation and economically feasible.

Other objects, advantages, and novel features of the invention will become apparent from the following detailed description of the invention when considered in conjunction with the accompanying drawings.

DESCRIPTION OF THE PREFERRED EMBODIMENT

Figure 2:
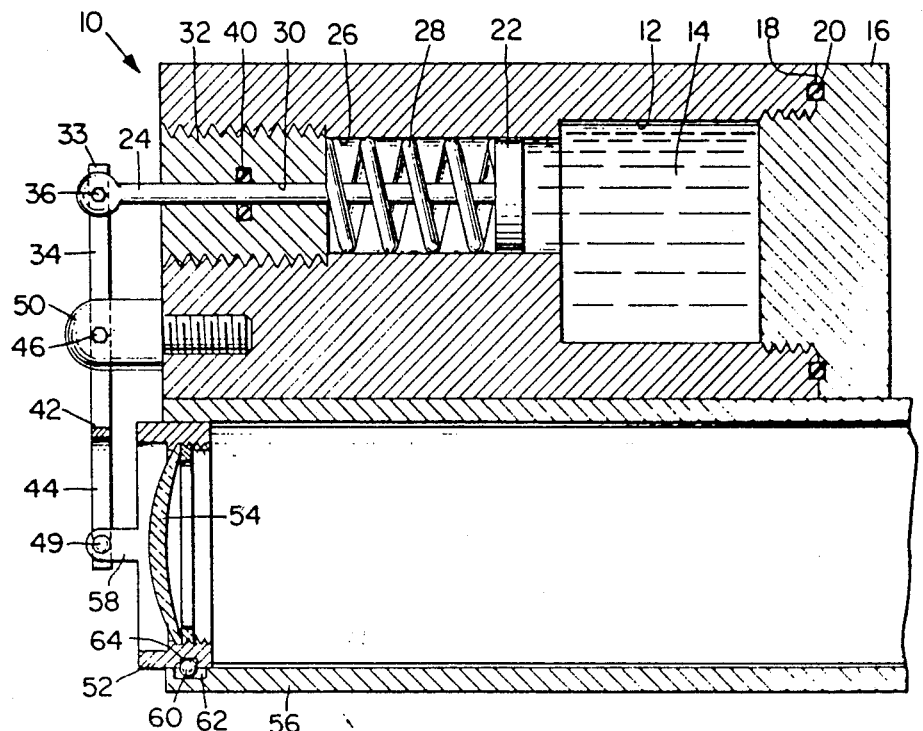
FIG. 2 is a horizontal cross-sectional view of the housing and attached lens cell along the line 2—2 of FIG. 1.

Referring now to the drawings, there is shown a housing 10 containing a reservoir 12 filled with a hydraulic fluid 14. A removable closure member 16 is threaded into end 18 of housing 10 and closes the reservoir 12, while an O-ring 20 prevents loss of fluid from reservoir 12. A reciprocable piston 22 with an attached piston rod 24 is mounted within a chamber 26, the latter communicating with reservoir 12. A coil spring 28 is also positioned within chamber 26 so as to encircle the piston rod 24, and is adapted to exert pressure on the piston 22, urging the latter toward a position adjacent the reservoir 12.

The outer end of piston rod 24 extends through an aperture 30 in a packing gland 32, and is pivotally connected to the upper end 33 of an arm 34 by suitable means such as nut and bolt, 36–38. Leakage of hydraulic fluid 14 from chamber 26 is prevented by O-ring 40 or a similar device. The arm 34 is positioned at substantially a 90° angle in relation to the piston rod 24 and is bifurcated at the lower end 42 to form fork arms 44. The arm 34 is also operatively connected at substantially its midlength by a nut 46 and bolt 48 to fulcrum 50 which is mounted on the end of housing 10, all substantially as shown in the drawing.

Figure 1:
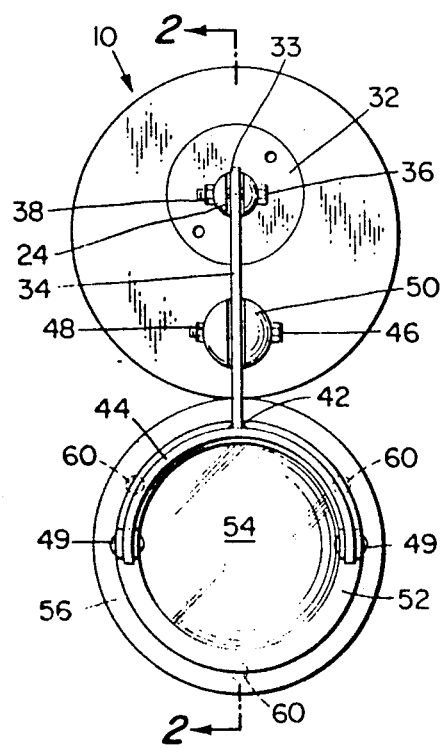
FIG. 1 is an end view of a housing and a linked lens cell in which the lens is supported.

A lens cell 52, adapted to support a lens 54, is slidably positioned in a guide 56 located parallel to and below housing 10. Lens cell 52 is pivotally connected through the protuberances 58 to each arm of fork 44 by pins 49 as shown in FIGS. 1 and 2. Ball bearings 60 may be positioned in cooperating grooves 62 and 64 located in the guide 56 and cell 52 respectively. Such ball bearings may be employed to permit limited friction-free fore-and-aft movement of the lens cell.

A change in ambient temperatures will cause the hydraulic fluid 14 either to contract or expand. This in turn will shift piston 22 held under tension by spring 28 to actuate arm 34 which pivots on fulcrum 50 and moves fork 44 in a fore or aft direction. Since the lens cell 52 is pivotally connected to the arms of fork 44 it and the mounted lens 54 will also move in a fore or aft direction thereby varying its focal point and maintaining the proper optical focus despite the temperature change. In the embodiment shown the lens cell movement is in a direction opposite any movement of the guide 56 as a result of the same temperature variation.

Figure 3:
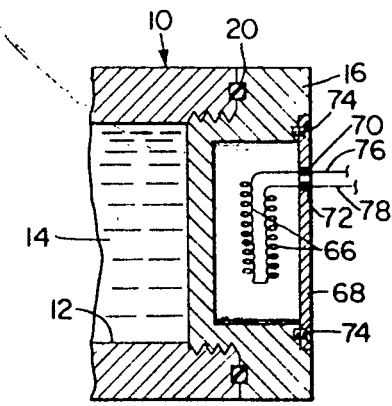
FIG. 3 is a cross-sectional view of the rear portion of the housing of FIG. 2 showing a further embodiment of the invention wherein an electric heater is incorporated within the housing.

FIG. 3 shows a modified arrangement of the device in that an electric heat source such as a pair of heating coils 66 is positioned within a chamber in closure member 16 and adjacent the end of the reservoir 12. An O-ring 20 maintains the leak proof integrity of the reservoir. An end plate 68 having apertures 70 and 72 therein may be mounted on closure member 16 by screws 74. The apertures permit heating coil wires 76 and 78 to have an exit from the hollow interior of closure member 16.

Obviously many modifications and variations of the present invention are possible in the light of the above teachings. It is therefore to be understood that within the scope of the appended claims the invention may be practiced otherwise than as specifically described.

I claim:

1. A lens mount having an ambient temperature compensation control comprising:
   a housing;
   a fluid-containing reservoir positioned intact in said housing;
   a closure member positioned in said housing and adapted to retain the fluid within said reservoir;
   a hydraulically actuated reciprocable piston and attached piston rod operatively associated with said reservoir and with a portion of said piston rod extending exteriorly of the housing through an aperture in said closure member, said piston with the attached piston rod adapted to move in response to expansion or contraction of the fluid within said reservoir depending on the ambient temperature;
   a lens cell slidably positioned adjacent said housing;
   linkage means pivotally connecting the portion of said piston rod extending exteriorly of the housing with said lens cell for moving the lens cell in response to the expansion and contraction of the reservoir fluid; and
   a lens supported by said lens cell,
   whereby changes in volume of the reservoir fluid will actuate the piston and piston rod, thus adjusting the lens according to ambient temperature variations.

2. A lens mount as defined in claim 1 wherein:

a cylinder is axially located in said housing adjacent one end of the reservoir and communicating therewith;

a closure plug having an axially directed aperture therein is adapted to close one end of said cylinder, said hydraulically actuated piston being operatively positioned in the cylinder with a portion of the piston rod extending through said aperture in the plug.

3. A lens mount as defined in claim 2 wherein:

a spring is positioned in said cylinder and is adapted to tension the piston in a resting position.

4. A lens mount as defined in claim 1 further comprising:

an electric heating coil positioned adjacent the reservoir thus enabling temperature control of the fluid therein from a remote source and independently of the ambient temperature.

5. A temperature-compensating arrangement for an optical system having an optical path which is altered as a result of variations in ambient temperature comprising:

a housing structurally mounted alongside the optical instrument containing the optical elements subject to displacement by temperature variations, said housing containing a reservoir area;

a supply of fluid in said reservoir said fluid expanding when the reservoir area is heated and contracting when it is cooled;

said reservoir having a movable wall member directly displaceable in response to expansion and contraction of said fluid;

a movable optical element forming a part of said optical path and serving when moved to correct for optical errors introduced by ambient temperature variations;

and means pivotally linking said movable wall and said movable optical element so that expansion of said fluid causes movement of said optical element in one direction and contraction of said fluid causes movement of said optical element in the opposite direction;

whereby changes in said optical path characteristics as a result of ambient temperature fluctuations are compensated for by opposite movements of said movable element to eliminate optical inaccuracies resulting from such changes in optical path characteristics.